(12) United States Patent
Sawai

(10) Patent No.: US 7,395,179 B2
(45) Date of Patent: Jul. 1, 2008

(54) ROTATION ANGLE CALCULATING METHOD OF WIRE HARNESS, ROTATION ANGLE CALCULATING APPARATUS, AND COMPUTER-READABLE RECORDING MEDIUM

(75) Inventor: Masayoshi Sawai, Kosai (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/566,571

(22) PCT Filed: Jul. 28, 2004

(86) PCT No.: PCT/JP2004/011107

§ 371 (c)(1),
(2), (4) Date: Jan. 31, 2006

(87) PCT Pub. No.: WO2005/012830

PCT Pub. Date: Feb. 10, 2005

(65) Prior Publication Data

US 2006/0241896 A1    Oct. 26, 2006

(30) Foreign Application Priority Data

Jul. 31, 2003    (JP)    ............................... 2003-204374

(51) Int. Cl.
*G06F 15/00*    (2006.01)
(52) U.S. Cl. ......................................... 702/151; 702/42
(58) Field of Classification Search ................. 702/151, 702/42
See application file for complete search history.

(56) References Cited

U.S. PATENT DOCUMENTS

2002/0161535 A1* 10/2002 Kawakita et al. .............. 702/42

OTHER PUBLICATIONS http://www.m-w.com/dictionary/vector, p. 1.*
http://209.161.33.50/dictionary/caculate, p. 1.*
http://209.161.33.50/dictionary/angle, p. 1.*
http://209.161.33.50/dictionary/shape, p. 1.*
http://209.161.33.50/dictionary/vector, p. 1.*
D.S. Liu, Study of wire bonding looping formation in the electronic packaging process using three-dimensional finite element method, Oct. 22, 2002, p. 263-286.*
http://mw1.merriam-webster.com/dictionary/tangent, p. 1.*

* cited by examiner

*Primary Examiner*—Tung S Lau
(74) *Attorney, Agent, or Firm*—Sughrue Mion, PLLC

(57) ABSTRACT

In a rotation angle calculating method of a wire harness, a rotation angle of the wire harness is calculated at an arbitrary measuring point of the wire harness when the wire harness is deformed from a first shape to a second shape while a fixed point of the wire harness is fixed. The method include the steps of: setting intermediate points between the fixed point and the measuring point of the wire harness in the second shape; setting vectors at the nodes of the wire harness in the second shape as node vectors respectively; calculating angles, each of which has a rotation direction, wherein each of the angles is defined between the vectors at the adjoining nodes; and adding the angles to each other so as to calculate a rotation angle having a rotation direction at the measuring point.

15 Claims, 12 Drawing Sheets

FIG. 4A
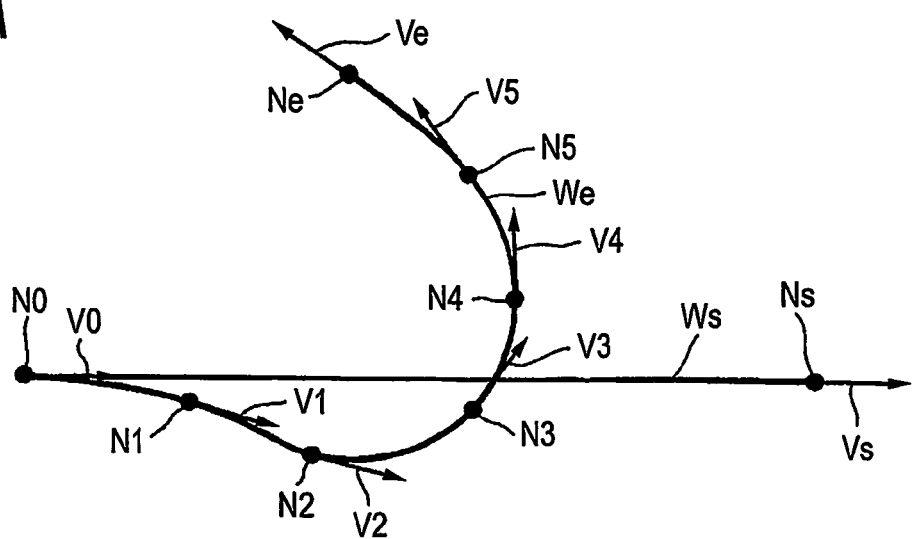
FIG. 4B
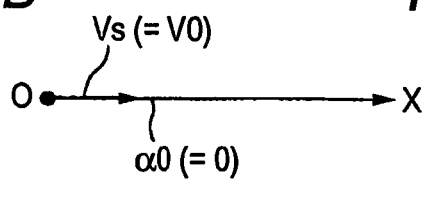
FIG. 4C
FIG. 4D
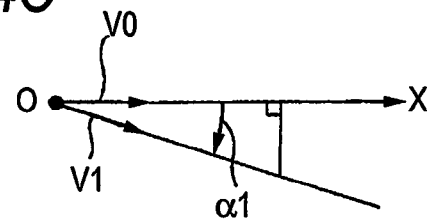
FIG. 4E
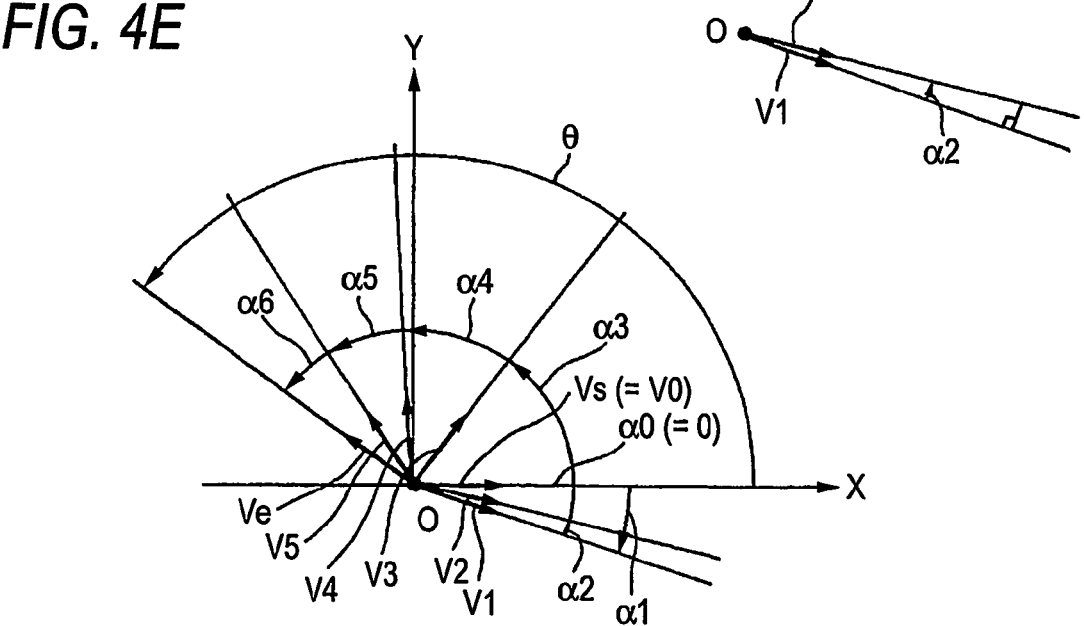

FIG. 7A
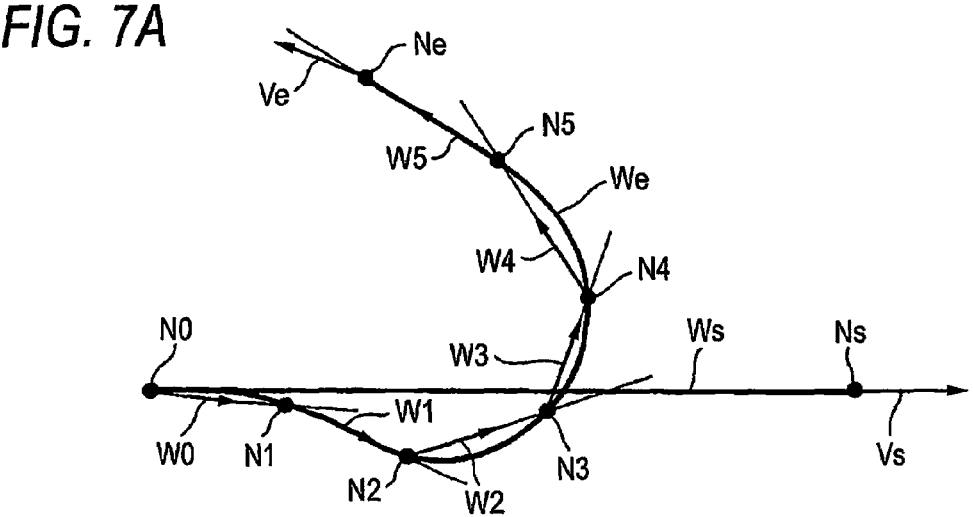
FIG. 7B
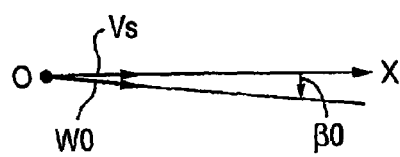
FIG. 7C
FIG. 7D
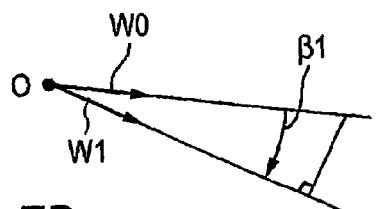
FIG. 7E
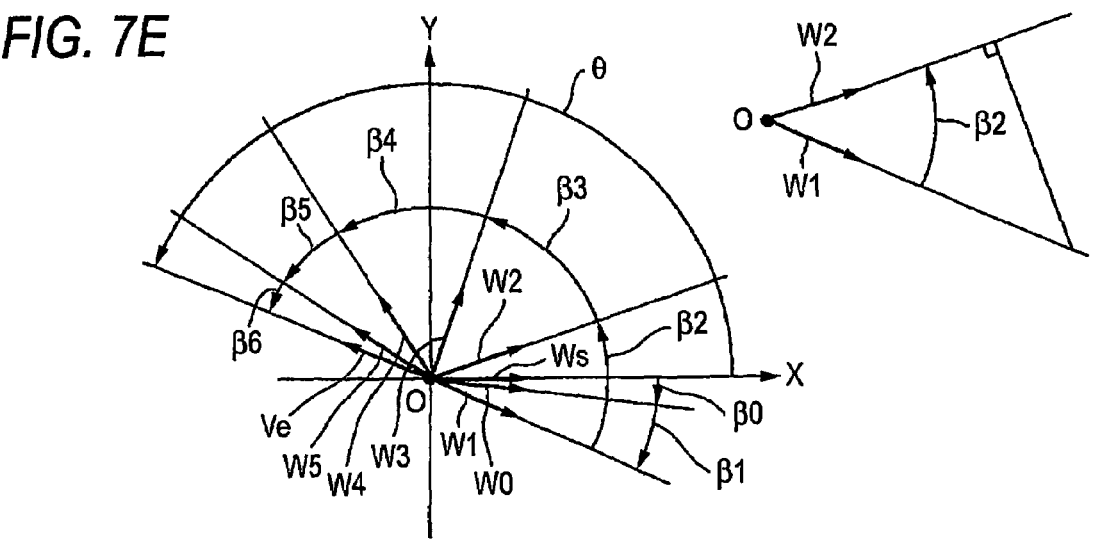

ROTATION ANGLE CALCULATING METHOD OF WIRE HARNESS, ROTATION ANGLE CALCULATING APPARATUS, AND COMPUTER-READABLE RECORDING MEDIUM

TECHNICAL FIELD

The present invention relates to a rotation angle calculating method of a wire harness, a rotation angle calculating apparatus of the wire harness, a recording medium which stores a rotation angle calculating program. More specifically, the present invention relates to a rotation angle calculating method of a wire harness, a rotation angle calculating apparatus of the wire harness, a recording medium which stores a rotation angle calculating program thereof, by which a rotation angle involving a rotation direction can be calculated.

BACKGROUND ART

Recently, while various sorts of electric appliances are mounted on vehicles and the like, these electric appliances are connected to each other by employing line-shaped members in which a plurality of wiring lines and a plurality of communication lines are bundled by employing such binding members as a insulation lock, and such protecting members as tapes. Furthermore, such restricting members known as cramps are provided at edge portions and intermediate portions of such wire harnesses in order that these wire harnesses are connected to the electric appliances, and/or fixed to vehicle bodies.

Normally, a wire harness provided with such restricting members is distributively arranged on a predetermined portion, while being deformed from an initial shape of the wire harness under which this wire harness is expanded on a jig plate up to a final shape of the wire harness which may depend upon a shape of a vehicle body and various sorts of interfering articles. The respective portions in the final shape of the wire harness are brought into a rotated condition with respect to the same portions in the initial shape thereof. For instance, in such a case that the restricting member mounted on the predetermined portion of the wire harness corresponds to an elongated hole type cramp, or the like, distortions and stresses are continuously applied to the restricting member and the portion of the wire harness on which the restricting member is mounted.

Under such a circumstance, for example, in order to previously investigate durability and the like as to a restricting member which is mounted on a wire harness and the wire harness itself, one related calculating method proposes a method of calculating a rotation angle at a predetermined portion of the wire harness in a final shape thereof by utilizing a computer. However, such a problem could be revealed in the related rotation angle calculating method, since the rotation angle is calculated by merely considering only predetermined measuring points in the initial shape and the final shape. This problem will now be explained with FIGS. 11A to 11C and FIG. 12.

FIG. 11A to FIG. 11C are diagrams showing three typical patterns which may possibly occur when wire harnesses are deformed from initial shapes thereof to final shapes thereof. FIG. 12 is a diagram showing measuring points in both the initial shapes and the final shapes by employing vectors shown in FIG. 11A to FIG. 11C. It should be noted that for the sake of simple explanations, although the initials shapes are assumed as linear shapes, these initial shapes are not limited to the linear shapes.

In a first pattern shown in FIG. 11A, while an elongated hole type connector $1s$ mounted one edge of a wire harness, which is shown by Ps is rotated by an angle $\theta 1$, this connector $1s$ is lifted up to such a position indicated by Pe in a linear manner, and thus, the wire harness is deformed from an initial shape Ws to a final shape We. In this case, the other edge of the wire harness is located at a fixed point P0.

Also, in a second pattern shown in FIG. 11B, while an elongated hole type connector $1s$ mounted one edge of a wire harness, which is shown by Ps is rotated by an angle $\theta 2$ ($=360$ degrees$-\theta 1$) along a left direction, this connector $1s$ is displaced up to such a position indicated by Pe2, and thus, the wire harness is deformed from an initial shape Ws to a final shape We2. In this case, the other edge of this wire harness is located at a fixed point P0. A portion of the wire harness is deformed in a ring shape in accordance with the displacement of the connector $1s$ as described in the above manner.

Also, in a third pattern shown in FIG. 11C, while an elongated hole type connector $1s$ mounted one edge of a wire harness, which is shown by Ps is rotated by an angle $\theta 3$ ($=360$ degrees$+\theta 1$) along a right direction, this connector $1s$ is displaced up to such a position indicated by Pe3, and thus, the wire harness is deformed from an initial shape Ws to a final shape We3. In this case, the other edge of this wire harness is located at a fixed point P0. Since the connector $1s$ is displaced in the above-described manner, a portion of the wire harness is deformed in a ring shape.

In the above-described first pattern to third pattern, the initial shapes Ws of the wire harnesses are commonly equal to each other, and directions of the connectors $1s$ in the final shapes are equal to each other. In this example, the directions of the connectors $1s$ in the initial shapes Ws are expressed by a vector Vs; the directions of the connectors $1s$ in the finals shapes We1, We2, We3 are expressed by a vector Ve1, a vector Ve2, and a vector Ve3, respectively. Also, when starting points of the respective vectors are moved to an origin "0" on an X-Y plane, these vectors may be represented as shown in FIG. 12.

As shown in FIG. 12, all of these vectors Ve1, Ve2, Ve3 are made completely identical to each other. As a consequence, even when the rotation angles in the first pattern to the third pattern are calculated respectively by merely paying an attention only to the predetermined measuring points in the initial shapes and the final shapes, the actual rotation angles $\theta 1$, $\theta 2$, $\theta 3$ cannot be correctly acquired. Precisely speaking, even when an angle defined between the vector Ve1 and the vector Vs, an another angle defined between the vector Ve2 and the vector Vs, and also, an another angle defined between the vector Ve3 and the vector Vs are calculated by employing a vector inner product, since all of the rotation angles obtained from the above calculations are made equal to each other, the actual rotation angles $\theta 1$, $\theta 2$, $\theta 3$ cannot be correctly calculated.

In other words, the final shapes of the first pattern to the third pattern are not reflected onto the rotation angles which are calculated in the above-described manner. As a result, eventually, the distortions and the stresses occurred on the restricting member such as the connector, and also, the portion of the wire harness where this restricting member is mounted, cannot be correctly investigated.

In FIG. 11, only these three typical patterns are exemplified. Furthermore, such a final shape of a wire harness may be alternatively provided which has been rotated two, or more turns to be deformed. Also, practically speaking, such a rotation angle in a three-dimensional space may cause such a problem. These examples may be similarly considered as the problem of the above-exemplified two-dimensional plane.

As a consequence, it is therefore an object of the present invention to provide a rotation angle calculating method of a wire harness, a rotation angle calculating apparatus of the wire harness, a recording medium storing rotation angle calculating program, which can precisely calculate a rotation angle having a rotation direction.

DISCLOSURE OF THE INVENTION

In order to achieve the above object, according to the present invention, there is provided a rotation angle calculating method as follows.

(1) In a rotation angle calculating method, a rotation angle of the wire harness, which is deformed from an initial shape thereof up to a final shape thereof while a predetermined fixed point is set as a center, is calculated at an arbitrary measuring point in the final shape from the initial shape, comprising: a respective nodes setting step in which after a space between the fixed point of the final shape and the measuring point is segmented to a plurality of elements, coupling points of the plural elements, the fixed point, and the measuring point are set as a node respectively; a reference tangent vector setting step for setting a tangent vector at the measuring point of the initial shape as a reference tangent vector; a respective tangent vectors setting step for setting tangent vectors at the respective nodes of the final shape as tangent vectors respectively; a respective angles calculating step for calculating angles which involve rotation directions and are defined between the respective tangent vectors at the respective adjoining nodes as respective angles; and a rotation angle calculating step for adding the respective angles to each other so as to calculate a rotation angle involving a rotation direction at the measuring point.

(2) A rotation angle calculating method, which has been made so as to solve the above-explained problem, is featured by such a rotation angle calculating method of a wire harness, in which a rotation angle of the wire harness, which is deformed from an initial shape thereof up to a final shape thereof while a predetermined fixed point is set as a center, is calculated at an arbitrary measuring point in the final shape from the initial shape, comprising: a respective nodes setting step in which after a space between the fixed point of the final shape and the measuring point is segmented to a plurality of elements, coupling points of the plural elements, the fixed point, and the measuring point are set as a node respectively; a reference tangent vector setting step for setting a tangent vector at the measuring point of the initial shape as a reference tangent vector; a final tangent vector setting step for setting a tangent vector at the measuring point of the final shape as a final tangent vector; a respective sequence of points vectors setting step for setting sequence of points vectors which are obtained from lines for connecting the respective adjoining nodes of the final shape as respective sequence of points vectors; a respective angles calculating step for calculating an angle involving a rotation angle, which is defined between the reference tangent vector and the sequence of points vector while the fixed point is defined as a starting point; an angle involving a rotation angle, which is defined between the respective sequence of points vectors where the respective adjoining nodes are defined as starting points; and an angle involving a rotation angle, which is defined between the sequence of points vector directed to the measuring point and the final tangent vector as respective angles; and a rotation angle calculating step for adding the respective angles to each other so as to calculate a rotation angle involving a rotation direction at the measuring point.

(3) Also, a rotation angle calculating method, which has been made so as to solve the above-explained problem, is featured by that in the rotation angle calculating method recited in (1), in such a case that both the initial shape and the final shape are commonly equal to non-linear shapes, a virtual initial shape having a linear shape corresponding to a tangent vector at the fixed point is supposed, and it is so assumed that the virtual initial shape is deformed to both the initial shape and the final shape respectively; the rotation angle in the case that the virtual initial shape is deformed to the initial shape is calculated as a first rotation angle by executing the respective nodes setting step, the reference tangent vector setting step, the respective tangent vectors setting step, the respective angles calculating step, and the rotation angle calculating step; the rotation angle in the case that the virtual initial shape is deformed to the final shape is calculated as a second rotation angle by executing the respective nodes setting step, the reference tangent vector setting step, the respective tangent vectors setting step, the respective angles calculating step, and the rotation angle calculating step; and a rotation angle involving the rotation direction at the measuring point in the case that the wire harness is deformed from the initial shape to the final shape is calculated based upon both the first rotation angle and the second rotation angle.

(4) Also, a rotation angle calculating method, which has been made so as to solve the above-explained problem, is featured by that in the rotation angle calculating method recited in (2), in such a case that both the initial shape and the final shape are commonly equal to non-linear shapes, a virtual initial shape having a linear shape corresponding to a tangent vector at the fixed point is supposed, and it is so assumed that the virtual initial shape is deformed to both the initial shape and the final shape respectively; the rotation angle in the case that the virtual initial shape is deformed to the initial shape is calculated as a first rotation angle by executing the respective nodes setting step, the reference tangent vectors setting step, the final tangent vector setting step, the respective sequence of points vectors calculating step, the respective angles calculating step, and the rotation angle calculating step; the rotation angle in the case that the virtual initial shape is deformed to the final shape is calculated as a second rotation angle by executing the respective nodes setting step, the reference tangent vector setting step, the final tangent vector setting step, the respective sequence of points vectors calculating step; the respective angles calculating step, and the rotation angle calculating step; and a rotation angle involving the rotation direction at the measuring point in the case that the wire harness is deformed from the initial shape to the final shape is calculated based upon both the first rotation angle and the second rotation angle.

(5) Also, a rotation angle calculating apparatus, which has been made so as to solve the above-explained problem, is featured by such a rotation angle calculating apparatus of a wire harness, in which a rotation angle of the wire harness, which is deformed from an initial shape thereof up to a final shape thereof while a predetermined fixed point is set as a center, is calculated at an arbitrary measuring point in the final shape from the initial shape, comprising: a respective nodes setting unit in which after a space between the fixed point of the final shape and the measuring point is segmented to a plurality of elements, coupling points of the plural elements, the fixed point, and the measuring point are set as a node respectively; a reference tangent vector setting unit for setting a tangent vector at the measuring point of the initial shape as a reference tangent vector; a respective tangent vectors setting unit for setting tangent vectors at the respective nodes of the final shape as tangent vectors respectively; a respective angles calculating unit for calculating angles which involve rotation directions and are defined between the respective tangent vectors at the respective adjoining nodes as respective angles; and a rotation angle calculating unit for adding the respective angles to each other so as to calculate a rotation angle involving a rotation direction at the measuring point.

(6) Also, a rotation angle calculating program, which has been made so as to solve the above-explained problem, is featured by such a rotation angle calculating program of a wire harness in order that a rotation angle of the wire harness, which is deformed from an initial shape thereof up to a final shape thereof while a predetermined fixed point is set as a center, is calculated at an arbitrary measuring point in the final shape from the initial shape, wherein: the rotation angle calculating program causes a computer to function as: a respective nodes setting unit in which after a space between the fixed point of the final shape and the measuring point is segmented to a plurality of elements, coupling points of the plural elements, the fixed point, and the measuring point are set as a node respectively; a reference tangent vector setting unit for setting a tangent vector at the measuring point of the initial shape as a reference tangent vector; a respective tangent vectors setting unit for setting tangent vectors at the respective nodes of the final shape as tangent vectors respectively; a respective angles calculating unit for calculating angles which involve rotation directions and are defined between the respective tangent vectors at the respective adjoining nodes as respective angles; and a rotation angle calculating unit for adding the respective angles to each other so as to calculate a rotation angle involving a rotation direction at the measuring point.

In accordance with the invention recited in (1), (5), (6), after the space between the fixed point of the final shape and the measuring point is segmented to a plurality of elements, the coupling points of the plural elements, the fixed point, and the measuring point are set as the node respectively; the tangent vector at the measuring point of the initial shape is set as a reference tangent vector; and the tangent vectors at the respective nodes of the final shape are set as tangent vectors respectively. Then, the angles which involve the rotation directions and are defined between the respective tangent vectors at the respective adjoining nodes are calculated as respective angles, and the respective angles are added to each other so as to calculate the rotation angle involving the rotation direction at the measuring point. It should also be understood that the rotation angle may involve such rotation angles larger than, or equal to 360 degrees.

Also, in accordance with the invention recited in (2), after the space between the fixed point of the final shape and the measuring point is segmented to a plurality of elements, the coupling points of the plural elements, the fixed point, and the measuring point are set as the node respectively; the tangent vector at the measuring point of the initial shape is set as a reference tangent vector; the tangent vector at the measuring point of the final shape as a final tangent vector; and the respective sequence of points vectors which are obtained from the lines for connecting the respective adjoining nodes of the final shape are set as respective sequence of points vectors. Then, the angle involving the rotation angle, which is defined between the reference tangent vector and the sequence of points vector while the fixed point is defined as a starting point; the angle involving the rotation angle, which is defined between the respective sequence of points vectors where the respective adjoining nodes are defined as starting points; and the angle involving the rotation angle, which is defined between the sequence of points vector directed to the measuring point and the final tangent vector are calculated as respective angles. Then, the respective angles are added to each other so as to calculate the rotation angle involving the rotation direction at the measuring point. It should also be understood that the rotation angle may involve such rotation angles larger than, or equal to 360 degrees.

In accordance with the invention recited in (3), in such a case that both the initial shape and the final shape are commonly equal to the non-linear shapes, it is so assumed that the wire harness is deformed from the virtual initial shape which is supposed as the linear shape into both the initial shape and the final shape which are equal to the non-linear shapes. Then, the rotation angle in the case that the virtual initial shape is deformed to the initial shape and the rotation angle in the case that the virtual initial shape is deformed to the final shape are calculated respectively by utilizing the tangent vectors, as explained above. As a result, such a rotation angle can be calculated which involves a rotation direction and which is located at a measuring point based upon these two rotation angles.

In accordance with the invention recited in (4), in such a case that both the initial shape and the final shape are commonly equal to the non-linear shapes, assuming now that the wire harness is deformed from the virtual initial shape which is supposed as the linear shape into both the initial shape and the final shape which are equal to the non-linear shape, the rotation angle in the case that the virtual initial shape is deformed to the initial shape and the rotation angle in the case that the virtual initial shape is deformed to the final shape are calculated respectively by utilizing the sequence of points vectors, as explained above. As a result, such a rotation angle can also be calculated which involve a rotation direction and which is located at a measuring point based upon these two rotation angles.

BRIEF DESCRIPTION OF THE DRAWINGS

The above objects and advantages of the present invention will become more apparent by describing in detail preferred exemplary embodiments thereof with reference to the accompanying drawings, wherein:

FIG. 4A to FIG. 4E are diagrams for explaining a calculation method of a rotation angle according to the first embodiment of the present invention;

FIG. 7A to FIG. 7E are explanatory diagrams for explaining a calculation method of a rotation angle according to the second embodiment of the present invention;

BEST MODE FOR CARRYING OUT THE INVENTION

Embodiments of the present invention will now be described with reference to drawings.

First Embodiment

Figure 1:
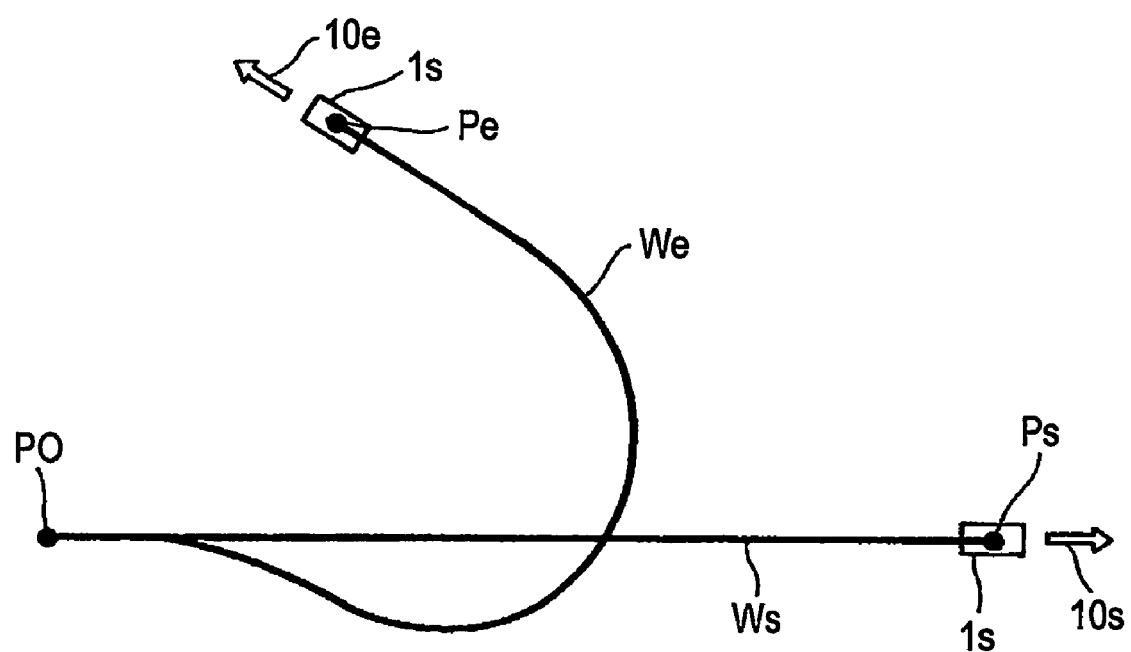
FIG. 1 is a diagram showing both an initial shape and a final shape of a wire harness according to the present invention.
Figure 2:
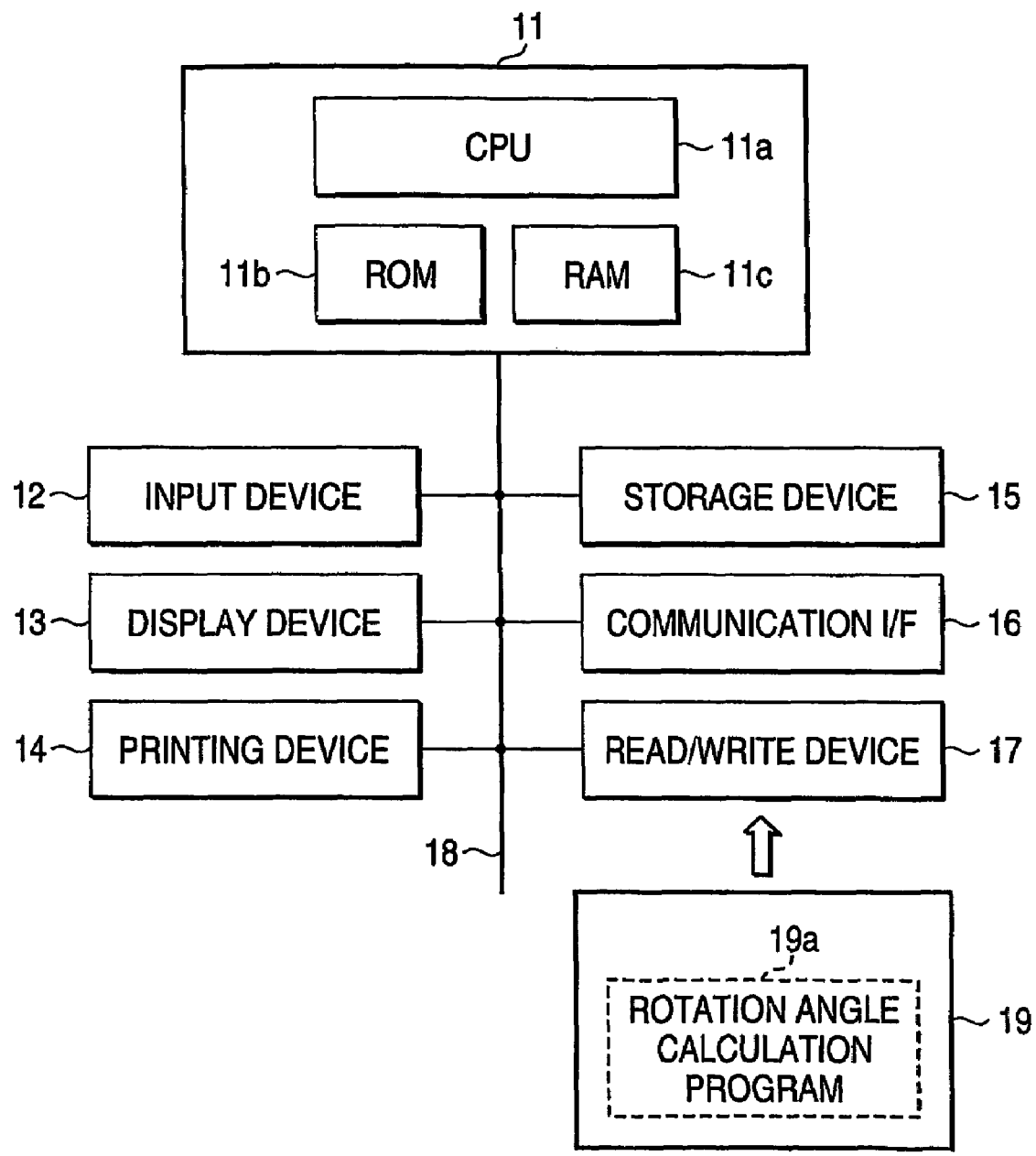
FIG. 2 is block diagram showing a hardware according to the present invention.
Figure 3:
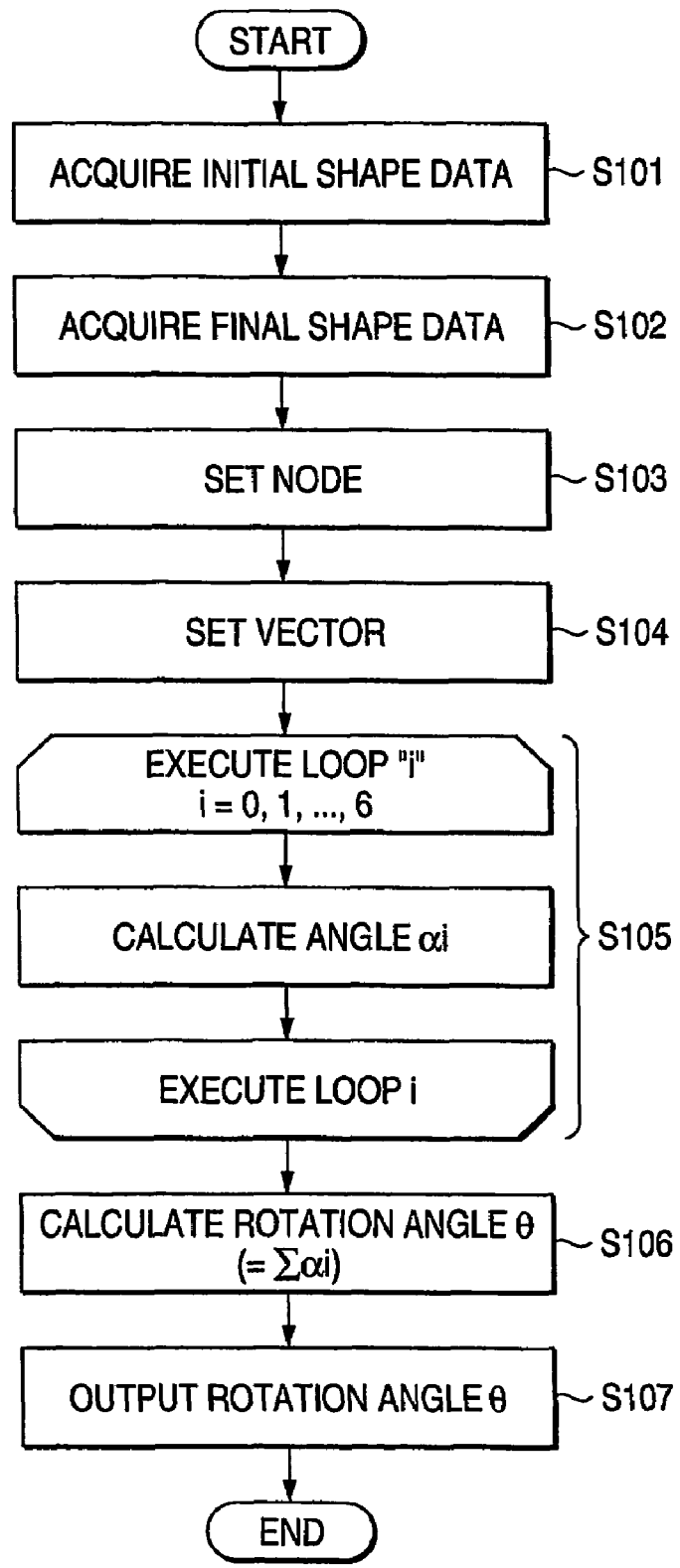
FIG. 3 is a flow chart showing a process sequential operation of a computer according to the first embodiment of the present invention.
Figure 5:
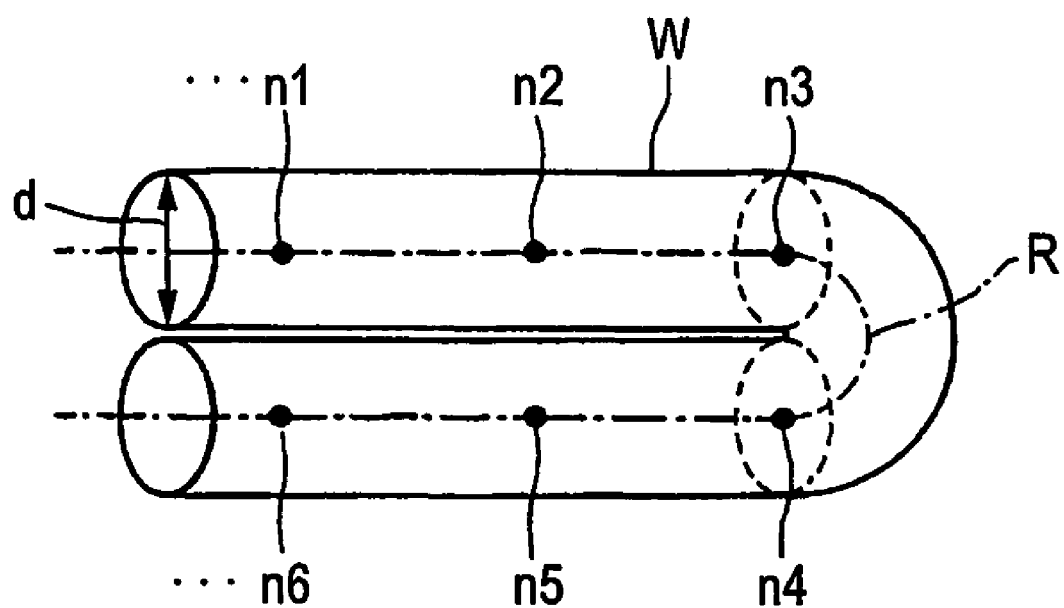
FIG. 5 is a diagram for explaining a preferable node-to-node distance.

FIG. 1 is a diagram showing both an initial shape and a final shape of a wire harness in order to explain both a first embodiment and a second embodiment of the present invention. FIG. 2 is block diagram showing hardware according to the present invention. FIG. 3 is a flow chart showing a process sequential operation of a computer according to the first embodiment of the present invention. FIG. 4A to FIG. 4E are diagrams for explaining a calculation method of a rotation angle according to the first embodiment of the present invention. FIG. 5 is a diagram for explaining a desirable node-to-node distance.

To explain the first embodiment, as indicated in FIG. 1, an elongated hole type connector 1s which is mounted on one end of a wire harness shown in "Ps" is rotated by an angle "θ" to be displayed up to a position shown in "Pe", and thus, the wire harness is deformed from an initial shape "Ws" having a linear shape up to a final shape "We." In this case, the other end of the wire harness is located at a fixed point "P0." The elongated hole type connector 1s has a shape of a rectangular flat plane. For example, The connector 1s has an elongated hole shaped mounting shaft portion which is inserted into an elongated hole pierced in a body of a vehicle. In other words, the connector 1s completely restricts the mounting portion of the connector 1s. A longitudinal direction of the connector 1s is directed to such a direction shown by "10s" in the initial shape Ws, and is directed to such a direction shown by "10e" in the final shape We.

In the first embodiment, a rotation angle (alternatively, may becomes larger than, or equal 360 degrees) which is defined by the direction 10s of the connector 1s in the initial shape Ws and the direction 10e of the connector 1s in the final shape We is calculated, while a rotation direction is involved in the rotation angle. As to hardware capable of realizing a calculation of a rotation angle of the wire harness, this hardware will now be explained with reference to FIG. 2.

As indicated in FIG. 2, as the hardware used to realize the present invention, for instance, either a well-known notebook type computer, a desk top type computer is employed. The computer includes a microcomputer 11, an input device 12, a display device 13, a printing device 14, a storage device 15, a communication interface 16 and a read/write device 17.

The microcomputer 11 contains a CPU (central processing unit) 11a, a ROM 11b, and a RAM 11c. The ROM 11b stores a boot program, and the like thereinto. The RAM 11c temporarily stores various sorts of processed results thereinto. The input device 12 corresponds to a keyboard, a mouse, and the like, which are used to input the various values. The display device 13 corresponds to an LCD, a CRT, and the like, which display a processed result. The printing device 14 corresponds to a printer for printing a processed result. Also, the storage device 15 corresponds to, for instance, a hard disk drive which stores an installed rotation angle calculation program 19a, a processed result obtained by this rotation angle calculation program 19a, and the like thereinto. Also, the communication interface 16 corresponds to a modem board, and the like, which performs a data communication operation with respect to another apparatus by employing, for example, a leased line, a LAN, the Internet, and so on. The read/write device 17 corresponds to such an apparatus which reads the rotation angle calculation program 19 which is stored in the recording medium 19 such as a CR-ROM and a DVD-ROM; which reads initial shape data and final shape data, which are stored in the storage medium 19; and which writes a calculated rotation angle into the recording medium 19. These structural elements are connected via an internal bus 18 to each other. As the rotation angle calculation program 19a, any one of programs corresponding to the first embodiment through a fourth embodiment (will be explained later) may be employed.

The microcomputer 11 installs the rotation angle calculations program 19a which is read by the read/write device 17 into the storage device 15. Also, after the power supply is turned ON, the microcomputer 11 is initiated in accordance with the boot program which is stored in the ROM 11b, and boots the installed rotation angle calculation program 19a. Then, the microcomputer 11 may calculate a rotation angle of a wire harness, may output the calculated rotation angle to the display device 13 and/or the printing device 14, and may store this calculated result into the storage device 15 in accordance with the rotation angle calculation program 19a. The rotation angle calculation program 19a may also be installed into another personal computer, or the like, which contains the above-described basic construction. After this rotation angle calculation program 19a is installed in the personal computer, this personal computer may function as a rotation angle calculating apparatus. The rotation angle calculation program 19a may be provided from not only the recording medium 19, but also may be provided via a communication line such as the Internet and a LAN.

Subsequently, a process operation of the computer according to the first embodiment of the present invention will be explained in addition to FIG. 3 through FIG. 5.

In both a step S101 and a step S102 of FIG. 3, both initial shape data and final shape data are acquired. Both the initial shape data and the final shape data may be previously stored in the storage medium 19, and both the initial shape data ant the final shape data are read by operating the read/write device 17. Alternatively, the initial shape data and the final shape data may be acquired via a LAN, the Internet, or the like. Furthermore, data which have been inputted through the input device 12 may be acquired. After both the initial shape data and the final shape data are acquired, both the initial shape data and the final shape data are preferably displayed on the display device 13 in the form of such an image shown in FIG. 1.

Next, in a step S103 of FIG. 3, a node setting operation is carried out. Precisely speaking, with respect to such a wire harness having both the initial shape and the final shape as shown in FIG. 1, as shown in FIG. 4A, a portion of the wire harness between a fixed point "N0" (corresponding to fixed point "P0" of FIG. 1) of the final shape We and an arbitrary measuring point, for instance, a point "Ne" (corresponding to point "Pe" of FIG. 1) where the connector 1s is mounted are segmented to a plurality of elements. Under this condition, coupling points of these elements, the fixed point "N0", and the measuring point "Ne" are set as nodes "N0", ... "Ne". The measuring point Ne is not limited to an end point of the wire harness. The measuring point may be an intermediate point of the wire harness. As a model of both the initial shape Ws and the final shape We shown in FIG. 4A, practically speaking, a center line of a wire harness having a predetermined width may be utilized. The step S103 corresponds to a node setting step and a node setting unit.

As shown in FIG. 5, when a diameter of an actual wire harness W is equal to "d", it is preferable that a distance "R" between successive nodes, i.e., n1-n2, ..., n5-n6, ..., smaller than, π·d/2. In FIG. 5, a dot line indicates a center line of the wire harness W, and the center line is utilized to form both a model of the initial shape Ws and a shape of the final shape We in FIG. 4A.

Next, in a step S104 of FIG. 3, a vector setting operation is carried out. Precisely speaking, as represented in FIG. 4A, a tangent vector at the measuring point Ns of the initial shape Ws is set as a reference tangent vector "Vs." Also, tangent vectors at the respective nodes No, ..., Ne of the final shape We are set as tangent vectors "V0", ..., "Ve", respectively. Both the reference tangent vector Vs and the respective tangent vectors V0, ..., Ve are set as unit vectors having specific directions. As to directions of the reference tangent vector Vs and the respective tangent vectors V0, ..., Ve, such tangent vectors which are largely directed to measuring points are set. The step S104 corresponds to a reference tangent vector setting step, the tangent vector setting step, the reference tangent vector setting step, and the tangent vector setting unit.

When such a vector setting operation is accomplished, each of angles "αi" is calculated. Precisely speaking, as shown in FIG. 4B, first of all, an angle "α0" defined between the reference tangent vector Vs and a first tangent vector V0 is calculated. Subsequently, as shown in FIG. 4C, an angle "α1" defined between the first tangent vector V0 and a next tangent vector V1 is calculated. Subsequently, as represent in FIG. 4D, an angle "α2" defined between the tangent vector V1 and next tangent vector V2 is calculated. That is, as shown in FIG. 4E, the respective angles α0, ..., α6 are sequentially calculated. The step S105 corresponds to an angle calculating step and an angle calculating unit.

While a vector inner product is utilized which is well known in this field, the respective angles "αi" are calculated. In other words, the respective angles may be calculated as "αi" which satisfy the following formula:

$$\cos \alpha_i = (V_{i-1} \cdot V_i)/(|V_{i-1}||V_i|)$$

In this case, for instance, while a definition as to a vector outer product is utilized which is well known in this field, rotation directions of the respective angles "αi" may be expressed. For instance, in FIG. 4E, directions may be expressed in such a manner that an angle change from the vector V0 to the vector V1 is expressed as plus (+), whereas an angle change from the vector V1 to the vector V2 is expressed as minus (−).

In such a rotation angle calculating method in which the tangent vectors are set to the respective nodes, as indicated in FIG. 4B, the angle "α0" defined between the reference tangent vector V2 and the first tangent vector V0 always becomes 0 degree. As a consequence, in order to reduce a calculation amount, while the angle calculation as to the angle α0 is omitted, angles defined between the respective tangent vectors at the respective adjoining nodes are calculated as angles.

When such calculating operations of the respective angles αi of the nodes are accomplished, a calculating operation as to a final rotation angle "θ" is carried out in a step S106 of FIG. 3. Precisely speaking, the respective angles "αi" (i=0, ..., 6) which are calculated in accordance with the above-described manner are added to each other, so that the final rotation angle "θ" may be calculated. This rotation angle "θ" corresponds to such an angle which is defined by both the above-described reference tangent vector Vs and the final tangent vector Ve, and which involves a rotation direction. As apparent from the foregoing description, there are some possibilities that the rotation angle "θ" may become larger than, or equal to 360 degrees. The step S106 corresponds to a rotation angle calculating step and a rotation angle calculating unit.

Then, in a step S107 of FIG. 3, the rotation angle θ which has been calculated is outputted. This rotation angle θ may be alternatively displayed on the display device 13, or may be alternatively printed out by the printing device 14. Further, this rotation angle θ may be alternatively stored in the storage device 15, may be alternatively recorded via the read/write device 17 onto the recording medium 19, or may be alternatively outputted through both the communication I/F 16 and the Internet, a LAN, etc. to other apparatus. Also, as a display image displayed on the display device 13, a figure, a character, a numeral, or a combination of these elements may be alternatively displayed on the display device 13, or the like.

As previously described, in accordance with the first embodiment of the present invention, since the angles involving the rotation directions are totalized which are defined between the respective tangent vectors at the respective adjoining nodes, the rotation angles involving the rotation directions can be calculated at the arbitrary measuring points on the wire harness. The respective adjoining nodes are set with respect to the final shape. The wire harness is deformed from the initial shape having the linear shape.

Second Embodiment

Figure 6:
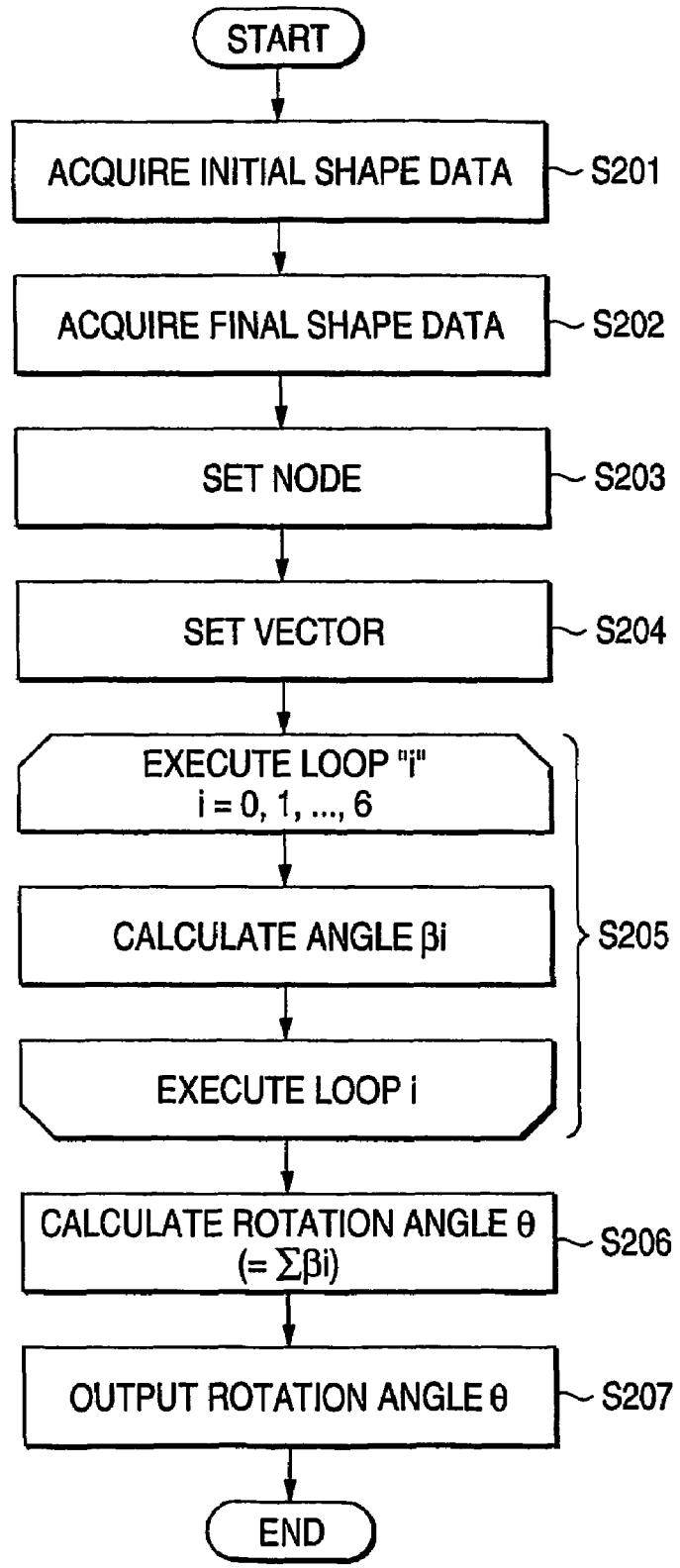
FIG. 6 is a flow chart showing a process operation of the computer according to a second embodiment of the present invention.

FIG. 6 is a flow chart for describing a process operation of the computer, according to a second embodiment of the present invention. FIGS. 7A to 7E are explanatory diagrams for explaining a calculation method of a rotation angle according to the second embodiment of the present invention. In this second embodiment, a description is made by supposing both the initial shape and the final shape of such a wire harness shown in FIG. 1. Also, in this second embodiment, the hardware exemplified in FIG. 2 is similarly utilized.

In both a step S201 and a step S202 of FIG. 6, both initial shape data and final shape data are acquired. In a step S203, a node setting operation is carried out. Since these data acquiring/node setting process operations are equivalent to those defined in the step S101, the step S102, and the step S103 of the first embodiments, duplicated explanations thereof are omitted. Similar to the first embodiment, a distance "R" between the respective adjoining nodes may be preferably made shorter than π·d/2 in FIG. 5. The step S203 corresponds to a node setting step.

Next, in a step S204, a vector setting operation is carried out. Precisely speaking, as represented in FIG. 7A, a tangent vector at the measuring point Ns of the initial shape Ws is set as a reference tangent vector "Vs." Also, a tangent vector at the measuring point Ne (see FIG. 1) of the final shape We is set as a final tangent vector "Ve." Furthermore, respective sequence of points vectors which are obtained from lines connecting the respective adjoining nodes N0, ..., Ne of the final shape We are set as sequence of points vectors W0, ..., W5, respectively. The reference tangent vector Vs, the final tangent vector Ve, and the respective sequence of points vectors W0, ..., W5 are also set as unit vectors having specific directions, respectively. As to directions of the reference tangent vector Vs, the final tangent vector Ve, and the respective sequence of points vectors W0, ..., W5, such tangent vectors which are largely directed to measuring points are set. The step S204 corresponds to a reference tangent vector setting step, a final tangent vector setting step, and a sequence of points vector setting step.

When such a vector setting operation is accomplished, each angle "βi" is calculated. Precisely speaking, as shown in FIG. 7B, first of all, an angle "β0" defined between the reference tangent vector Vs and a first sequence of points vector W0 is calculated. Subsequently, as shown in FIG. 7C, an angle "β1" defined between the first sequence of points vector W0 and a next sequence of points vector W1 is calculated. Subsequently, as represent in FIG. 7D, an angle "β2" defined between the sequence of points vector W1 and a next sequence of points vector W2 is calculated. That is, as shown in FIG. 7E, the respective angles β0, ..., β6 are sequentially calculated. The final angle "β6" corresponds to such an angle defined between the sequence of points vector W5 and the final tangent vector Ve. Similar to the first embodiment, the definitions as to the vector inner product and the vector outer product are utilized so as to calculate the respective angles "βi." The step S205 corresponds to an angle calculating step.

When such calculating operations of the respective angles βi are accomplished, a calculating operation as to a final rotation angle "θ" is carried out in a step S206. Precisely speaking, the respective angles "βi" (i=0, ..., 6) which have been calculated in accordance with the above-described manner are added to each other, so that the final rotation angle "θ" may be calculated. This rotation angle "θ" corresponds to such an angle which is defined by both the above-described reference tangent vector Vs and the final tangent vector Ve, and which involves a rotation direction. As apparent from the foregoing description, there are some possibilities that the rotation angle "θ" may become larger than, or equal to 360 degrees. The step S206 corresponds to a rotation angle calculating step.

Then, in a step S207, the rotation angle θ which has been calculated in the above-explained manner is outputted. This rotation angle θ may be alternatively displayed on the display device 13, or may be alternatively printed out by the printing device 14. Further, this rotation angle θ may be alternatively outputted to the storage device 15, may be alternatively outputted via the read/write device 17 onto the recording medium 19, or may be alternatively outputted through both the communication I/F 16 and the Internet, a LAN, etc. to other apparatus. Also, as a display image displayed on the display device 13, a figure, a character, a numeral, or a combination of these elements may be alternatively displayed on the display device 13, or the like.

As previously described, in accordance with the second embodiment of the present invention, the respective angles are calculated by utilizing the sequence of points vectors which are obtained from the line connecting the respective nodes in the final shape, and then, these calculated angles are added to each other. As a result, the rotation angles involving the rotation directions can be calculated at the arbitrary measuring points on the wire harness which has been deformed from the initial shape having the linear shape. More specifically, since the sequence of points vectors are obtained from the lines which connect the respective nodes to each other, the vector setting operation required in the angle calculation can be readily carried out.

Third Embodiment

Figure 8:
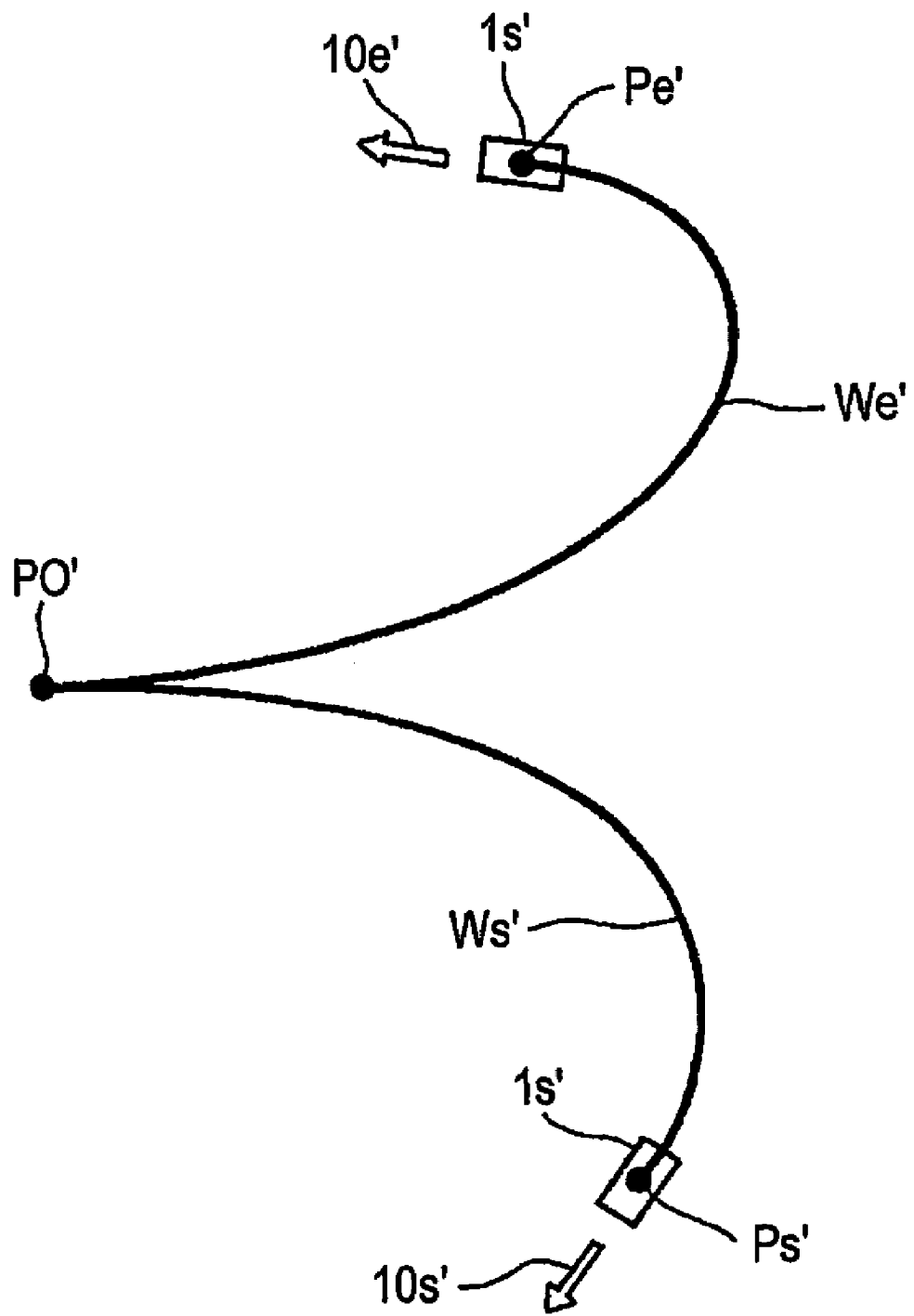
FIG. 8 is a diagram showing both an initial shape and a final shape of a wire harness according to a third embodiment of the present invention.
Figure 9:
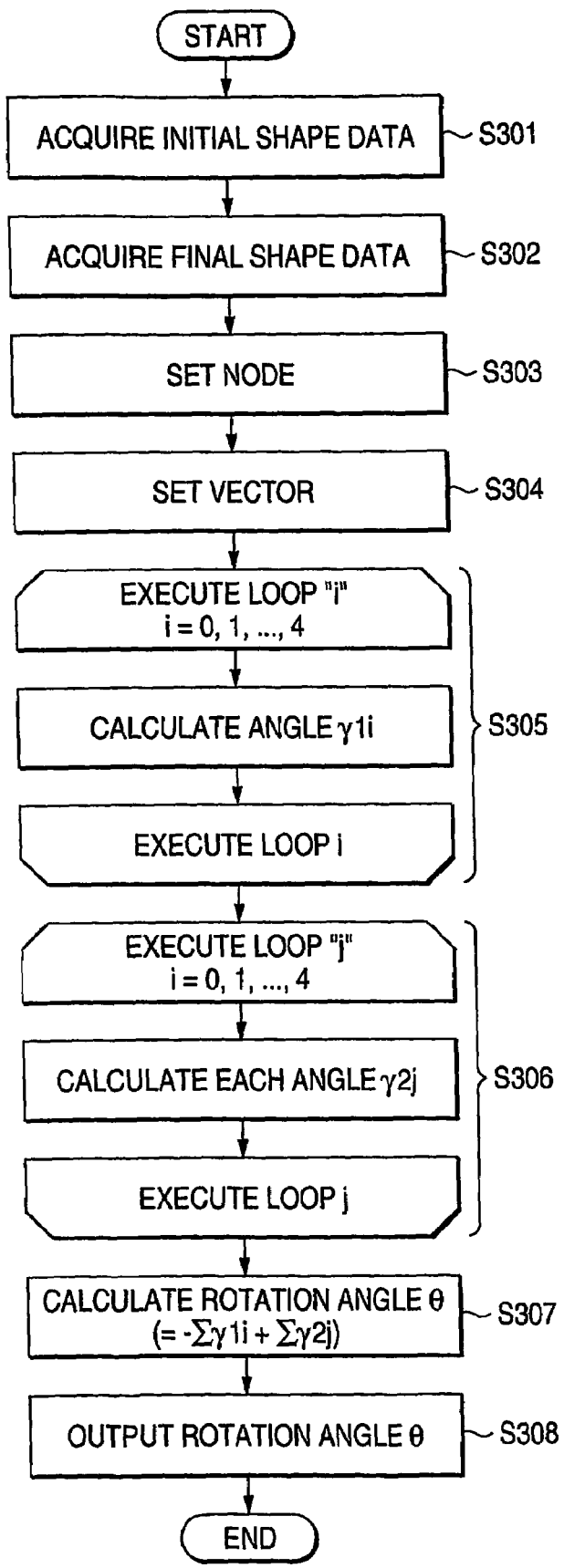
FIG. 9 is a flow chart showing a process operation of the computer according to the third embodiment of the present invention.
Figure 10A:
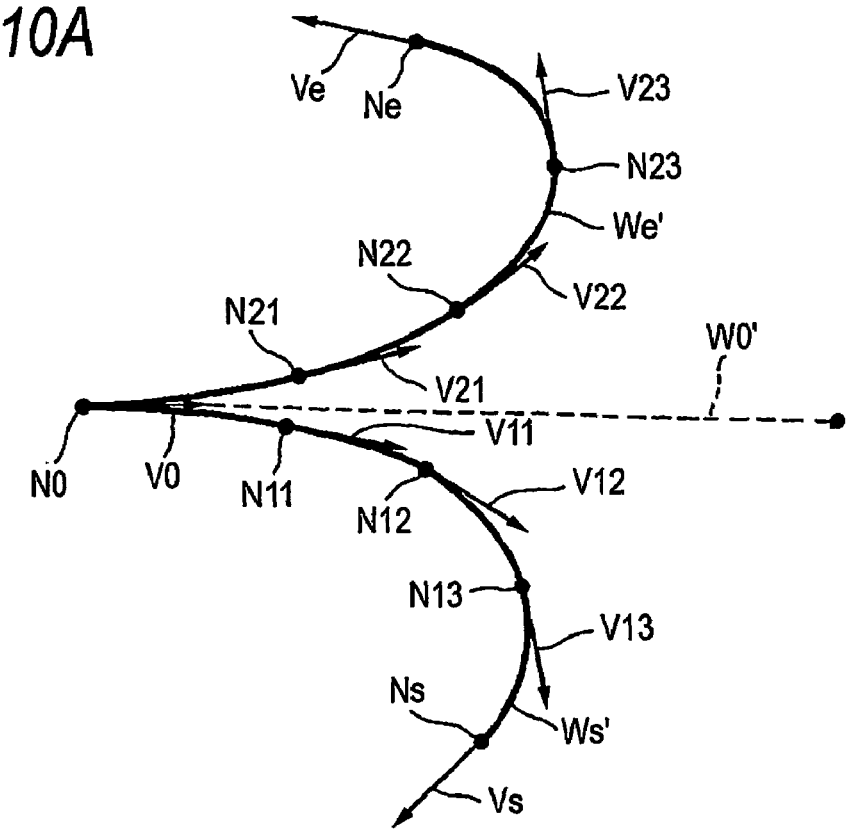
FIG. 10A and FIG. 10B are explanatory diagrams for explaining a calculating method of a rotation angle according to the third embodiment of the present invention.
Figure 10B:
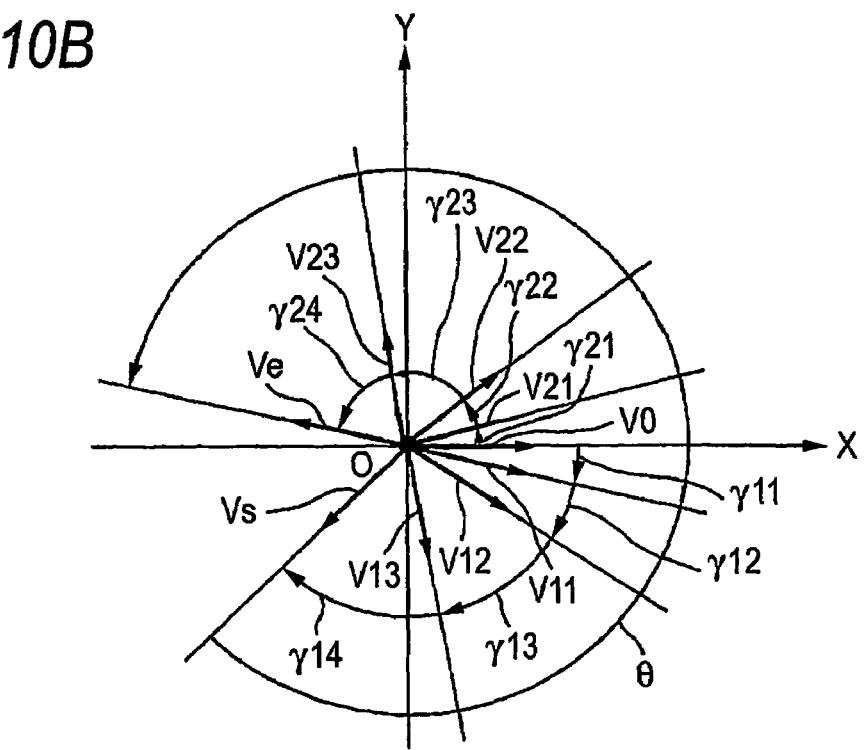
Figure 11A:
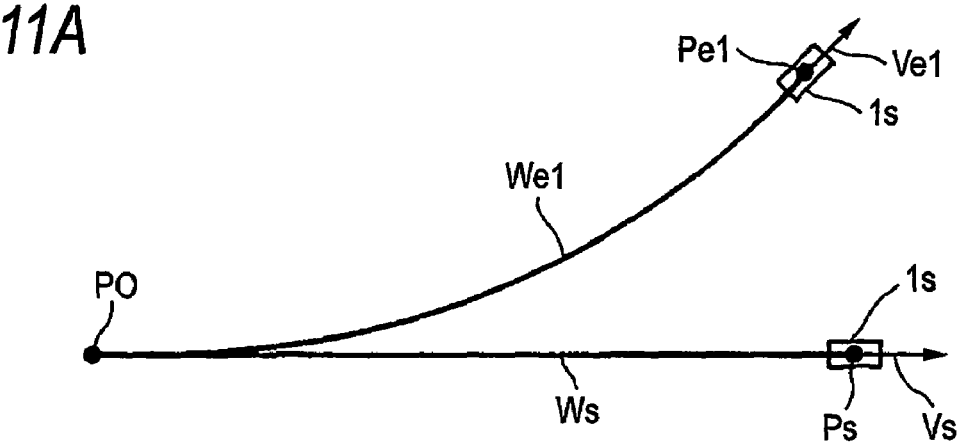
FIG. 11A to FIG. 11C are diagrams showing the three typical patterns which may occur when the wire harness is deformed from the initial shape to the final shape.
Figure 11B:
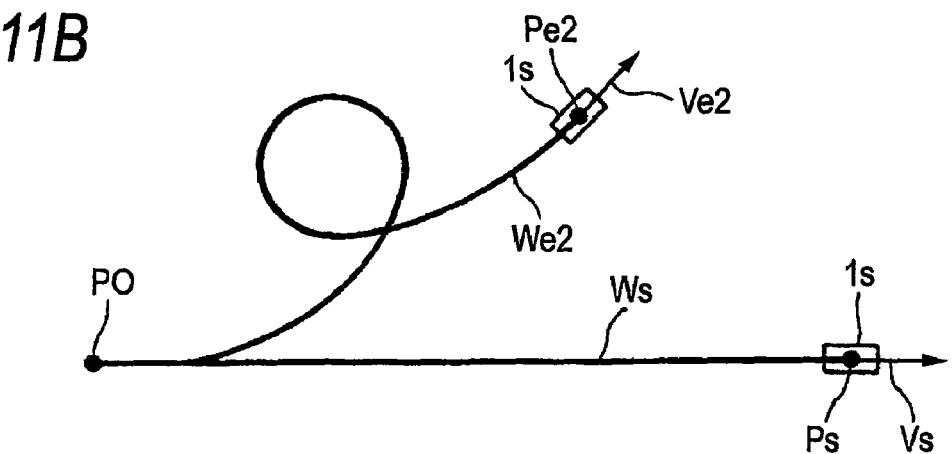
Figure 11C:
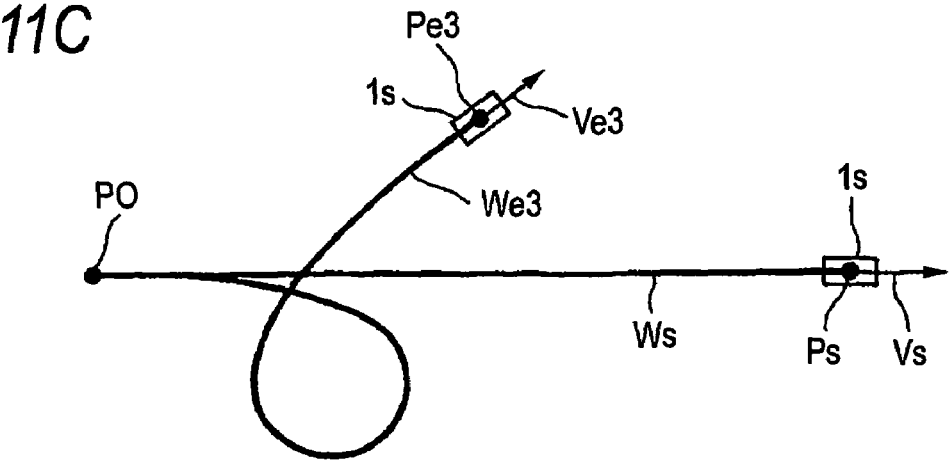
Figure 12:
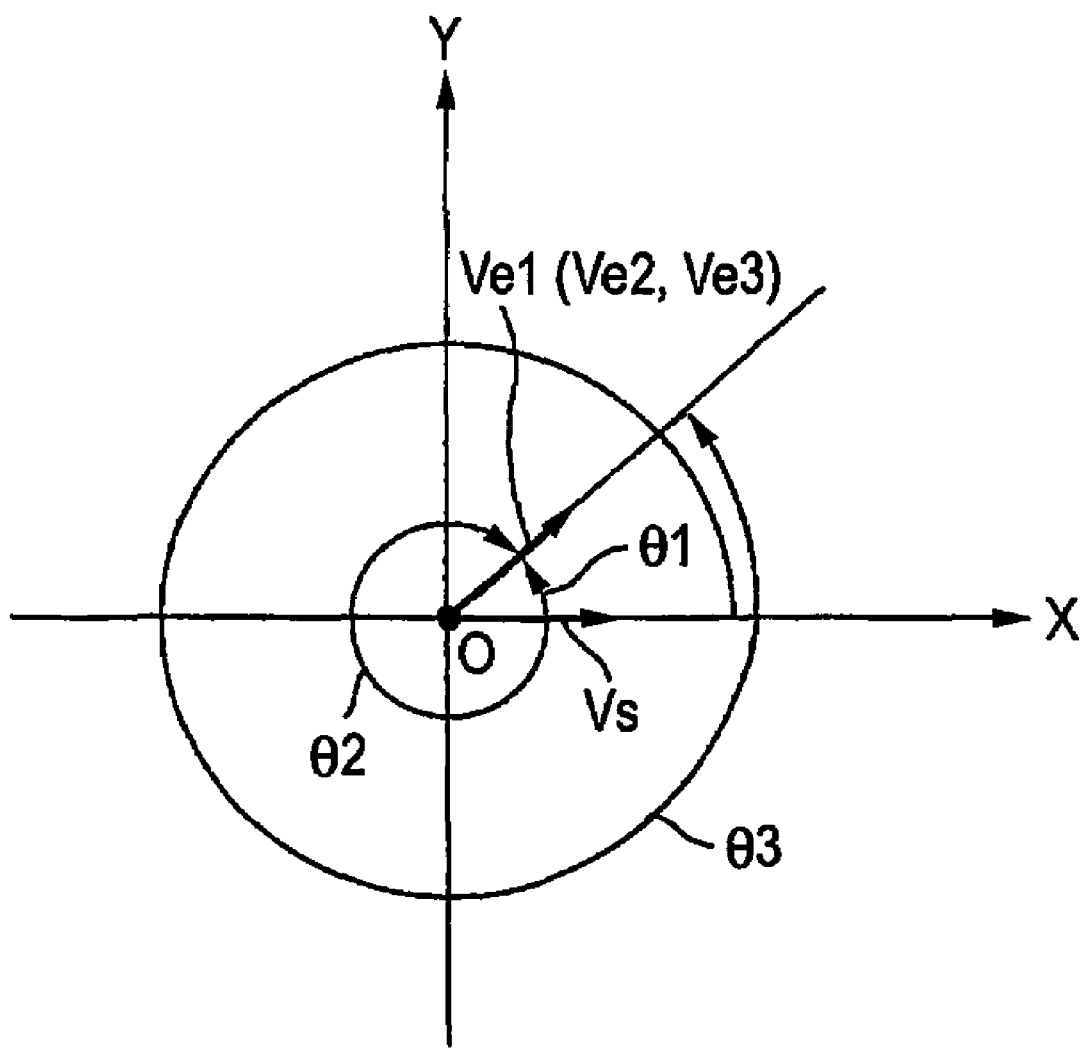
FIG. 12 is a diagram for indicating the measuring points in both the initial shape and the final shape shown in FIG. 11A to FIG. 11C by employing the vectors.

FIG. 8 is a diagram showing both an initial shape and a final shape of a wire harness according the third embodiment of the present invention. FIG. 9 is a flow chart for describing a process operation of the computer according to the third embodiment. FIG. 10A and FIG. 10B are explanatory diagrams for explaining a calculating method of a rotation angle according to the third embodiment. In this third embodiment, the hardware shown in FIG. 2 is similarly utilized.

In the third embodiment, as represented in FIG. 8, an initial shape "Ws'" of a wire harness having a non-linear shape is deformed as a final shape "We'" having a non-linear shape. Since an elongated hole type connector "1s'" which is mounted on one edge of such a wire harness shown in "Ps'" is rotated by an angle of "θ" and then is displaced up to such a position shown in "Pe'", the wire harness is deformed from the initial shape Ws' to the final shape We'. In this case, the other edge of the wire harness is assumed as a fixed point "P0'." The connector 1s' completely restricts a fixing portion of this connector 1s'. A longitudinal direction of the connector 1s' is directed to such a direction indicated by symbol "10s'" in the initial shape Ws', and then, the longitudinal direction thereof is directed to such a direction indicated by symbol "10e'" in the final shape We'. In the third embodiment, such a rotation angle (alternatively, may becomes larger than, or equal 360 degrees) which is defined by the direction 10s' of the connector 1s' in the initial shape Ws' and the direction 10e' of the connector 1s' in the final shape We' is calculated, while a rotation direction is contained.

In both a step S301 and a step S302 of FIG. 9, both initial shape data and final shape data are acquired. Both the initial shape data and the final shape data may be alternatively acquired in such a manner that such shape data which have been previously stored in the above-explained storage medium 19 are read by operating the read/write device 17. Alternatively, the initial shape data and the final shape data may be acquired via a LAN, the Internet, or the like. Furthermore, data which have been inputted by employing the input device 12 may be acquired. Both the initial shape data and the final shape data, which have been acquired, are preferably displayed on the display device 13 in the form of such an image shown in FIG. 8.

Next, in a step S303, a node setting operation is carried out. Precisely speaking, with respect to such a wire harness having both the initial shape and the final shape as represented in FIG. 8, a portion of the wire harness between a fixed point "N0" (corresponding to fixed point P0' of FIG. 8) of the initial shape Ws', and an arbitrary measuring point, for instance, a point "Ns" (corresponding to point Ps' of FIG. 8) where the connector 1s' is mounted are segmented to a plurality of elements. Under this condition, coupling points of these elements, the fixed point "N0", and the measuring point "Ns" are set as nodes "N0", N11, ..., N13, and Ns. The measuring point Ne is not limited to an end point of the wire harness, but the measuring point Ne may be an intermediate point of the wire harness. In addition, a portion of the wire harness between a fixed point "N0" (apparently, coincident with fixed point N0 of initial shape Ws') of the final shape We', and a point "Ne" (corresponding to Pe' of FIG. 8) where the connector 1s' is mounted are segmented to a plurality of elements. Then, coupling points of these elements, the fixed point N0, and the measuring point Ne are set as nodes N0, N21, ..., N23, and Ne.

Also, in a step S303, as indicated by a dot line of FIG. 10A, a virtual initial shape "W0'" having a linear shape is set which corresponds to the tangent vector V0 at the fixed point N0. In the subsequent process operation, assuming now that this virtual initial shape W0' is deformed to become both the initial shape Ws' and the final shape We' having the non-linear shapes, a final rotation angle is calculated. A distance "R" between the respective nodes is preferably smaller than Π·d/2 in FIG. 5 similar to the first embodiment.

Next, in a step S304, a vector setting operation is carried out. This vector setting operation is performed in a similar manner to that of the step S104 of the first embodiment. In other words, as represented in FIG. 10A, respective tangent vectors at respective nodes N0, N11, ..., N13, and Ns of the initial shape Ws' are set as respective tangent vectors V0, V11, ..., V13, and V2, whereas respective tangent vectors at respective nodes N21, ..., N23, and Ne of the final shape We' are set as respective tangent vectors V21, ..., V23, and Ve. It should also be noted that the reference tangent vector Vs, and the respective tangent vectors V0, V1, ..., V13, and Vs, V21, ..., V23, and Ve are set as unit vectors having specific directions, respectively. As to directions of these vectors, tangent vectors which are further directed to the measuring points are set.

When such a vector setting operation is accomplished, in a step S305, a calculation of respective angles "γ1i" is carried out in such an assumption case that the virtual initial shape W0' is deformed to the above-explained initial shape Ws'. That is to say, similar to the first embodiment, as indicated in FIG. 10B, the respective angles of γ10 (=0 degree), γ11, ..., γ14 are sequentially calculated. Similar to the first embodiment, the definitions as to the vector inner product and the vector outer product, which are well known in this field, are also utilized to the calculations of the respective angles γ1i.

Also, in a step S306, a calculation of respective angles "γ2j" is carried out in such an assumption case that the virtual initial shape W0' is deformed to the final shape We'. In other words, similar to the first embodiment, as shown in FIG. 10B, the respective angles of γ20 (=0 degree), γ21, ..., γ24 are sequentially calculated. Similar to the first embodiment, the definitions as to the vector inner product and the vector outer product, which are well known in this field, are also utilized to the calculations of the respective angles γ2j.

When the calculation of the respective angles γ1i and the calculation of the respective angles γ2j are ended, a final rotation angle "θ" is calculated in a step S307. Precisely speaking, an angle of "−Σγ1i" is added to a second rotation angle "Σγ2j" so as to calculate the final rotation angle θ. The first angle of "Σγ1i" is obtained by inverting a plus/minus symbol of a first rotation angle "Σγ1i" which is obtained by adding the respective angles "γ1i (i=0, ..., 4)" to each other calculated in the above-described manner (since angle is calculated by deforming shape along direction opposite to actual direction). The second rotation angle "Σγ2j" is obtained by adding the respective angles "γ2j (j=0, ..., 4)" to each other. Also, in this third embodiment, the final rotation angle "θ" corresponds to such an angle which involves rotation direction and which is defined between the reference tangent vector Vs and the final respective tangent vectors Ve, and there are some possibilities that this final rotation angle "θ" may become larger than, or equal to 360 degrees.

Then, in a step S308, the rotation angle θ which has been calculated in the above-explained manner is outputted. This rotation angle θ may be alternatively displayed on the display device 13, or may be alternatively printed out by the printing device 14. Further, this rotation angle θ may be alternatively stored in the storage device 15, may be alternatively recorded via the read/write device 17 onto the recording medium 19, or may be alternatively outputted through both the communication I/F 16 and the Internet, a LAN, etc. to other apparatus. Also, as a display image displayed on the display device 13, a figure, a character, a numeral, or a combination of these elements may be alternatively displayed on the display device 13, or the like.

As previously explained, in accordance with the third embodiment of the present invention, in such a case that both the initial shape and the final shape are commonly equal to the non-linear shapes, assuming now that the wire harness is deformed from the virtual initial shape (which is supposed as linear shape) into the initial shape and the final shape, which are equal to the non-linear shapes, both the rotation angle in the case that the virtual initial shape is deformed into the initial shape, and also, the rotation angle in such a case that the virtual initial shape is deformed into the final shape are calculated by utilizing the tangent vectors as explained above, respectively. As a result, such a rotation angle involving a rotation direction may also be calculated at an arbitrary measuring point on a wire harness whose shape has been deformed from an initial shape having a non-linear shape.

Fourth Embodiment

Although not shown in the drawings, while the sequence of points vectors of the second embodiment are utilized, a rotation angle in the case that both an initial shape and a final shape are commonly equal to non-linear shapes may be furthermore calculated as a fourth embodiment. Also, in this fourth embodiment, while a virtual initial shape having a linear shape is supposed, this virtual initial shape is deformed into both an initial shape and a final shape, which own non-linear shapes, and then, a final rotation angle is calculated. In this fourth embodiment, the final rotation angle is calculated by utilizing such sequence of points vectors shown in the second embodiment instead of the respective tangent vectors of the third embodiments.

As previously explained, in accordance with the fourth embodiment, in addition to the effect achieved in the third embodiment, since the sequence of points vectors are obtained from the lines connecting the respective nodes to each other, there is such an effect that the vector setting operation required in the angle calculating operation can be readily carried out.

As previously explained, in accordance with the embodiments of the present invention, both the rotation angle calculating method of the wire harness, the rotation angle calculating apparatus, and the recording medium storing rotation angle calculating program can be provided by which the rotation angles including the rotation directions can be correctly calculated, although the related technique could not correctly calculate the rotation angles involving the rotation directions.

In the respective embodiments, the description has been made by employing the two-dimensional plane. Alternatively, rotation angles in a three-dimensional space may be similarly calculated. In other words, the present invention may cover the rotation angle calculating operation in the three-dimensional space. Also, a measuring point used to calculate a rotation angle is not limited only to an edge point of a wire harness, but may be alternatively set to an intermediate point of the wire harness. Further, a plurality of measuring points may be alternatively employed. Apparently, the present invention may cover such a modification example which has been modified within a range which is not deviated from the technical scope and spirit of the present invention.

INDUSTRIAL APPLICABILITY

As previously described, in accordance with the present invention, since the angles containing the rotation direction, which are defined by the respective tangent vectors at the respective adjoining nodes set with respect to the final shape are added to each other, the rotation angle involving the rotation direction at the arbitrary measuring point on the wire harness deformed from the linear shape can be calculated.

In accordance with the invention, while the sequence of points vectors are utilized which are obtained from the lines for coupling the respective nodes in the final shape, the respective angles are calculated, and then, the calculated angles are added to each other. As a result, the rotation angle involving the rotation direction at the arbitrary measuring point on the wire harness deformed from the linear shape can be calculated. In particular, since the sequence of points vectors are obtained from the lines for connecting the respective nodes, the vector setting operations required for calculating the angles can also be easily carried out.

In accordance with the invention, in such a case that both the initial shape and the final shape are commonly equal to the non-linear shapes, assuming now that the wire harness is deformed from the virtual initial shape which is supposed as the linear shape into both the initial shape and the final shape which are equal to the non-linear shapes, the rotation angle in the case that the virtual initial shape is deformed to the initial shape and the rotation angle in the case that the virtual initial shape is deformed to the final shape are calculated respectively by utilizing the tangent vectors, as explained above. As a result, such a rotation angle can also be calculated which involve a rotation direction and which is located at an arbitrary measuring point on a wire harness which has been deformed from an initial shape equal to a non-linear shape.

In accordance with the invention, in such a case that both the initial shape and the final shape are commonly equal to the non-linear shapes, assuming now that the wire harness is deformed from the virtual initial shape which is supposed as the linear shape into both the initial shape and the final shape which are equal to the non-linear shape, the rotation angle in the case that the virtual initial shape is deformed to the initial shape and the rotation angle in the case that the virtual initial shape is deformed to the final shape are calculated respectively by utilizing the sequence of points vectors, as explained above. As a result, such a rotation angle can also be calculated which involve a rotation direction and which is located at an arbitrary measuring point on a wire harness which has been deformed from an initial shape equal to a non-linear shape. In particular, since the sequence of points vectors are obtained from the lines for connecting the respective nodes, the vector setting operations required for calculating the angles can also be easily carried out.

The invention claimed is:

1. A rotation angle calculating method of a wire harness, in which a rotation angle of the wire harness is calculated at an arbitrary measuring point of the wire harness when the wire harness is deformed from a first shape to a second shape while a fixed point of the wire harness is fixed, the rotation angle calculating method, comprising the steps of:
   setting a plurality of intermediate points between the fixed point and the measuring point of the wire harness in the second shape, wherein the fixed point, the measuring point and the intermediate points are set as nodes respectively;
   setting vectors tangent to the wire harness at the nodes of the wire harness in the second shape as node vectors respectively;
   calculating angles, each of which has a rotation direction, wherein each of the angles is defined between the node vectors at the adjoining nodes;
   adding the angles to each other so as to calculate a rotation angle having a rotation direction at the measuring point; and
   recording said rotation angle.

2. The rotation angle calculating method as set forth in claim 1, wherein the vectors at the nodes of the wire harness in the second shape are tangent vectors.

3. The rotation angle calculating method as set forth in claim 1, further comprising the steps of:
   setting a tangent vector at the measuring point of the wire harness in the first shape as a reference tangent vector; and
   setting a tangent vector at the measuring point of the wire harness in the second shape as a final tangent vector,
   wherein the vectors at the intermediate points of the nodes of the wire harness in the second shape are sequence of points vectors which are obtained from lines connecting the respective adjoining nodes of the wire harness in the second shape; and
   wherein in the angles calculating step, an angle defined between the reference tangent vector and the sequence of points vector at the fixed point as a starting point, an angle having a rotation angle, which is defined between the respective sequence of points vectors at the respective adjoining intermediate points of the nodes as starting points; and an angle having a rotation angle, which is defined between the sequence of points vector directed to the measuring point and the final tangent vector are calculated.

4. The rotation angle calculating method as set forth in claim 1, wherein the plurality of nodes are set on a center line of the wire harness.

5. The rotation angle calculating method as set forth in claim 1, wherein a distance between the adjoining nodes is set as following formula; wherein,
   the distance R is smaller than $\pi \cdot d/2$; and
   "d" is a diameter of the wire harness.

6. A computer-readable recording medium, which causes a computer to execute the rotation angle calculating method as set forth in claim 1.

7. The rotation angle calculating method as set forth in claim 2, further comprising the steps of:
   setting a virtual shape having a linear shape which extends in a direction of a tangent vector at the fixed point in a case that both the first shape and the second shape of the wire harness are non-linear shapes;
   calculating a first rotation angle at the measuring point in a case that the wire harness is deformed from the virtual shape to the first shape while the fixed point of the wire harness is fixed by performing the node setting step, the vector setting step, the angles calculating step and the angles adding step;
   calculating a second rotation angle at the measuring point in a case that the wire harness is deformed from the virtual shape to the second shape while the fixed point of the wire harness is fixed by performing the node setting step, the vector setting step, the angles calculating step and the angles adding step; and
   calculating a rotation angle having the rotation direction at the measuring point in a case that the wire harness is deformed from the first shape to the second shape based on the first and second rotation angles.

8. A computer-readable recording medium, which causes a computer to execute the rotation angle calculating method as set forth in claim 2.

9. The rotation angle calculating method as set forth in claim 3, further comprising:
   setting a virtual shape having a linear shape which extends in a direction of a tangent vector at the fixed point in a case that both the first shape and the second shape of the wire harness are non-linear shapes;

calculating a first rotation angle at the measuring point in a case that the wire harness is deformed from the virtual shape to the first shape while the fixed point of the wire harness is fixed by performing the node setting step, the vector setting step, the reference tangent vector setting step, the final tangent vector setting step, the angles calculating step and the angles adding step;

calculating a second rotation angle at the measuring point in a case that the wire harness is deformed from the virtual shape to the second shape while the fixed point of the wire harness is fixed by performing the node setting step, the vector setting step, the reference tangent vector setting step, the final tangent vector setting step, the angles calculating step and the angles adding step; and calculating a rotation angle having the rotation direction at the measuring point in a case that the wire harness is deformed from the first shape to the second shape based on the first and second rotation angles.

10. A computer-readable recording medium, which causes a computer to execute the rotation angle calculating method as set forth in claim 3.

11. A computer-readable recording medium, which causes a computer to execute the rotation angle calculating method as set forth in claim 4.

12. A computer-readable recording medium, which causes a computer to execute the rotation angle calculating method as set forth in claim 5.

13. A computer-readable recording medium, which causes a computer to execute the rotation angle calculating method as set forth in claim 7.

14. A computer-readable recording medium, which causes a computer to execute the rotation angle calculating method as set forth in claim 9.

15. A rotation angle calculating apparatus for calculating a rotation angle of the wire harness at an arbitrary measuring point of the wire harness when the wire harness is deformed from a first shape to a second shape while a fixed point of the wire harness is fixed, the rotation angle calculating apparatus, comprising:

a node setting unit, which sets a plurality of intermediate points between the fixed point and the measuring point of the wire harness in the second shape, wherein the fixed point, the measuring point and the intermediate points are set as nodes respectively;

a node vector setting unit, which sets vectors tangent to the wire harness at the nodes of the wire harness in the second shape as node vectors respectively;

an angles calculating unit, which calculates angles, each of which has a rotation direction, wherein each of the angles is defined between the vectors at the adjoining nodes; and an angles adding unit, which adds the angles to each other so as to calculate a rotation angle having a rotation direction at the measuring point.

* * * * *